United States Patent [19]

Schulz

[11] Patent Number: 4,560,346
[45] Date of Patent: Dec. 24, 1985

[54] METHOD FOR HARDENING FORM SUBSTANCES OF BUILDING MATERIALS CONTAINING BINDING AGENTS AND AUTOCLAVE FOR THE EXECUTION OF THE METHOD

[75] Inventor: Eckhard Schulz, Wallenhorst, Fed. Rep. of Germany

[73] Assignee: Sicowa Verfahrenstechnik fuer Baustoffe GmbH & Co. KG, Aachen, Fed. Rep. of Germany

[21] Appl. No.: 632,766

[22] Filed: Jul. 20, 1984

[30] Foreign Application Priority Data

Jul. 22, 1983 [DE] Fed. Rep. of Germany ....... 3326492

[51] Int. Cl.⁴ .................. F27D 7/00; F27D 13/00; F26B 5/04; F26B 21/06
[52] U.S. Cl. ........................... 432/24; 34/15; 34/51; 432/12; 432/26; 432/148
[58] Field of Search ............. 34/22, 26, 30, 51, 15, 34/179; 432/12, 18, 24, 26, 148, 209

[56] References Cited

U.S. PATENT DOCUMENTS

| 1,415,623 | 5/1922 | Atkinson | 34/15 |
| 1,572,849 | 2/1926 | Secord | 34/30 |
| 1,643,775 | 9/1927 | Kelleher | 432/18 |
| 1,672,218 | 6/1928 | How | 34/179 |
| 2,431,201 | 11/1947 | Ross | 34/26 |
| 2,929,151 | 3/1960 | Hicks | 34/51 |

FOREIGN PATENT DOCUMENTS 470006 8/1937 United Kingdom .................. 34/26

Primary Examiner—John J. Camby
Attorney, Agent, or Firm—Jordan and Hamburg

[57] ABSTRACT

The method relates to the hardening of form substances made of building materials and containing binding agents in a pressure chamber of an autoclave to which is conveyed a gaseous heating medium, the temperature of which is increased during a heating-up phase up to a given upper limit value. During a holding phase, the temperature is maintained at least until a given equalization temperature is reached on the inside of the form substances. Subsequently, during a cooling-down phase, the temperature is reduced by reducing the pressure to the expulsion temperature. Porous light building materials in a conventional process would absorb a high amount of water through the condensation of water resulting from steam having been conveyed into the autoclave for the purpose of hardening. However, in order to produce form substances of a low water content economically, according to the present invention, on the one hand, steam is replaced by gas which is maintained below the evaporation temperature of water through sufficient increase in pressure, and, on the other hand, as a replacement or complement, heat is conveyed to the inside of the pressure chamber before the cooling-down phase and an increase in the temperature of the steam beyond the given limit value is prevented by blowing off steam, thereby attaining an integrated drying process.

30 Claims, 1 Drawing Figure

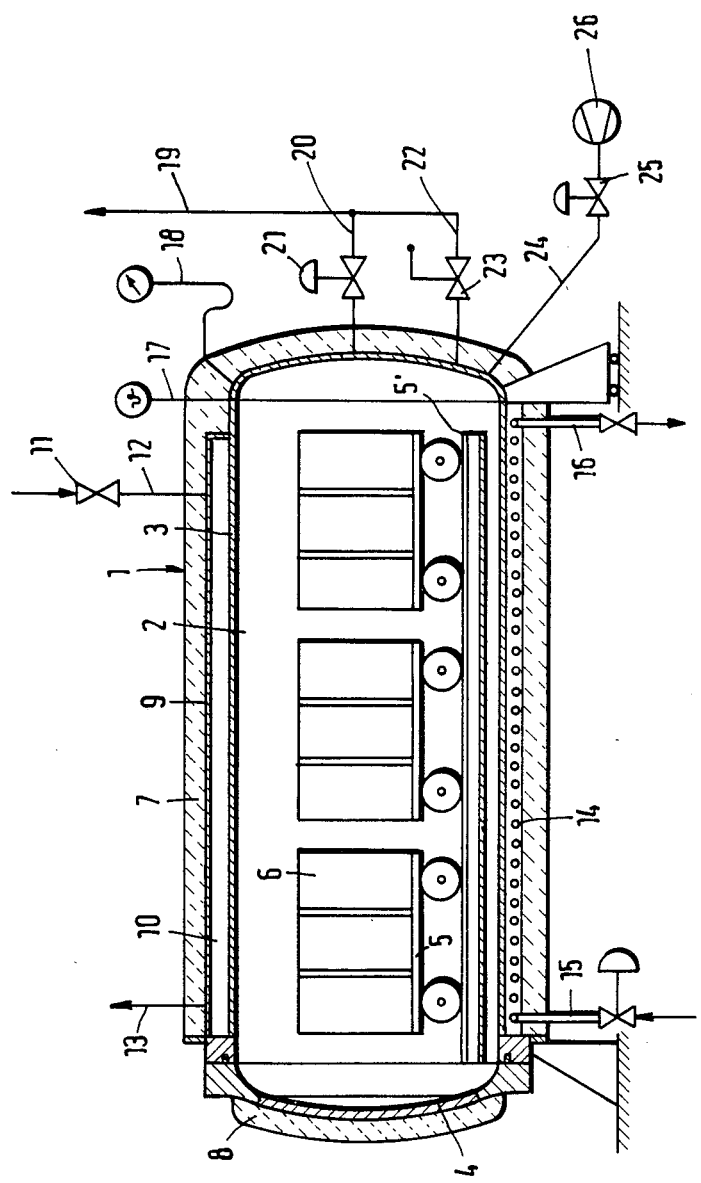

METHOD FOR HARDENING FORM SUBSTANCES OF BUILDING MATERIALS CONTAINING BINDING AGENTS AND AUTOCLAVE FOR THE EXECUTION OF THE METHOD

BACKGROUND OF THE INVENTION

The invention relates to a method for hardening form substances made out of building materials containing binding agents, especially light porous construction materials, in water/steam inside of a pressure chamber of an autoclave.

In the known methods of this kind, the heat necessary for the hardening of the form substances is supplied by means of saturated steam which is fed into the pressure chamber of the autoclave. The heat supplied by means of the steam essentially is limited to the heating-up phase, while the heat supplied by conveying additional steam during the holding phase is limited to the amount that is necessary for maintaining the predetermined upper limit temperature of the saturated steam in view of the insignificant heat loss occurring in the pressure container. The holding phase period depends on the utilized building materials as well as on the time required for the inside of the form substances to reach the desired equalization temperature for hardening. In the autoclaving of, for example, silicate building materials, the equalization temperature is approximately 156° C., and the upper limit temperature of the saturated steam at a saturation pressure of 16 bar is 203° C. When hardening is completed after reaching the equalization temperature, and after the holding phase, there follows a cooling-off phase during which the steam pressure is usually continuously linearly reduced until it reaches the ambient pressure. Subsequently, the form substances are taken out of the pressure chamber and are ready for further use after complete cooling off to the ambient temperature.

When such a hardening method is used, form substances made of heavy building materials usually attain satisfactory hardness values at a water content in the order or magnitude of approximately 3 to 5% of volume. This order or magnitude complies with the equalization value of the water content of the form substances in masonry.

If, however, form substances made of light building materials, especially, for example, porous silicate or porous concrete, undergo such a hardening method, then it can be observed that they leave the pressure container of the autoclave with a water content in the order or magnitude of approximately 20% of volume which not only impairs the hardness of the form substances but also increases significantly their weight and decreases their heat insulating properties. Only after a long drying period, usually in the walled-up state, do form substances made of such light building material attain their equalization water content of approximately 3 to 5% of volume. Consequently, this leads to considerable additional heating costs in order to dry out the masonry until the form substances reach their equalization water content and thereby their full hardness and heat insulation properties. Because the form substances undergo considerable shrinkage during such a drying process, it is to be expected that the buildings will have cracks.

The high water content of form substances made of light building materials, especially porous light building materials, at leaving the autoclave is due to the fact that the form substances are heavily charged with mixing water, and then absorb additional water during the hardening process from the condensation of steam on the surfaces of the form substances that are able to absorb condensation, whereby the surfaces especially of light building materials are already considerably increased. The water contained in the form substances remains therein almost entirely because the heat content in the form substances made out of light building materials is insufficient to bring about a considerable amount of water reduction by evaporation during the cooling-off phase.

It has already been proposed that for the reduction of water content of completely hardened form substances made of light building materials to submit the form substances to vacuum drying before the hardening treatment in the autoclave. This, however, does not lead to satisfactory results because the form substances absorb considerable amounts of condensation water during the hardening process in the saturated steam atmosphere. Furthermore, such a method is very expensive from the point of view of energy consumption and equipment requirements.

An object of the present invention is to provide a simple, effective and energy-efficient method for hardening form substances made of building materials containing binding agents, especially made of porous light building materials, which can be regulated to approximately 3 to 5% of water by volume.

The method according to this invention goes beyond the traditional fundamental process based upon the utilization of water vapor in the saturated steam range for the purpose of a heating medium, and introduces a heating medium which is "dry". In its simplest application, ambient air can be utilized, whereby the existing vapor content resulting from the relative air humidity can be considered harmless. By prior or simultaneously increasing the pressure in the pressure chamber of the autoclave, it is assured that on the inside the pressure dependent evaporation temperature of water is not reached, even though the temperature is increased over and above the required equalization temperature up to a predetermined upper limit, and, thus the detrimental consequences of working with steam can be avoided. In particular, the form substances are no longer exposed to wet vapor during the heating-up phase, during which vapor would condense on the still cooler form substances and would settle as condensation, in addition to the original mixing water from the shaping, with the result that the water content requirements necessary for the chemical hardening process would be far exceeded.

Because the method of the invention does not exceed the evaporation temperature of water, neither in the heating-up phase, nor in the holding phase, the form substances remain unaffected by evaporation processes which could lead to a deterioration of the structure of the materials, especially before and during the hardening process, and in direct relation to the extent specific ranges are exposed or how deeply removed they are from the heating medium. Significant energy saving also go hand-in-hand with a "steam free" autoclaving method. During autoclaving of building materials by conveying steam into the inner chamber of the autoclave, approximately 40 to 43% of the heat loss results from condensation. In addition, there are considerable energy losses in operating a steam boiler with feedwater deaeration and residue losses, whereas the degree of effectiveness of heating gas can be realized much more favorably. All this leads to great advantages in an autoclaving method with a gaseous heating medium which is kept below the evaporation temperature of water.

Thereby the pressure increase in a closed autoclave chamber cannot be left solely to the thermally induced pressure increase because the isochoric characteristic curve derived at normal conditions also lies above the steam pressure curve of water at temperatures above 156° C. On the other hand, additional pressure is needed, which can be attained at an initial autoclave pressure of 9 bars or more, so that after the heatingup to, for example 156° C., which is considerably above the equalization temperature, and a pressure of 13 or more bars, a state of the gaseous heating medium is maintained which lies below the steam pressure curve.

However, the additional required pressure can also be introduced continuously or gradually during the heating-up phase. Thereby, the heating can take place in the autoclave itself, and specifically with a heating apparatus mounted on or inside it. It is, however, also possible to pass hot gas into the pressure chamber of the autoclave. It can be generated as hot gas on the outside and pumped directly into it, or it can be drawn in from the outside, or the gas circulated through the autoclave can be heated up, for example, by an external heat exchanger.

In an additional utilizable solution of the invention, it is also feasible if the heating-up and the hardening take place with the conventional heating medium of water vapor, either in consideration of utilizing an already-existing steam boiler equipment to utilize water vapor fast heat transmission. The high water content resulting especially with porous light building materials is reduced by a hardening method which integrates a drying method, i.e. by conveying heat during a particular phase, whereby the form substances receive the amount of heat which is required for evaporating the water contained in the form substances up to a desired remaining water content level. The consequent increase in temperature resulting from the saturation stage of the steam in the pressure chamber of the autoclave is prevented by blowing off steam, and the related disturbances in the equilibrium between the water and steam present in the pressure chamber of the autoclave caused by blowing off of steam is equalized by the constant evaporation of water out of the form substances. As far as processing engineering and equipment requirements are concerned, this method assures a simple way of producing form substances of the desired low water content at the time of leaving the pressure chamber of the autoclave. The method of the invention is highly accurately controllable and achieves an excellent degree of effectiveness, whereas, at the same time, existing autoclaves can still be utilized and require only relatively minor modifications before being utilizable for executing the method of the present invention.

A suitable autoclave for the execution of the method needs only to be equipped with a heating apparatus for the pressure chamber. In addition, the autoclave is equipped also with a steam pressure regulation valve in a blowing-off conduit, which usually even in the conventional autoclaves is already in place, and which possesses adjustable regulation characteristics. With the aid of such a regulation valve, it is possible during heat conveyance to preset a temperature/pressure process of the steam in that phase during which the evaporation of water out of the form substances occurs due to heating after reaching the upper limit temperature, which assures an evaporation and energy optimizing method of treatment of form substances.

In principle, it is possible with the method of the present invention to keep using the conventional heat supply during the heating-up phase by conveying steam into the pressure chamber of the autoclave, and to only initiate the heat supply after reaching the upper limit temperatures by heating the inside of the pressure chamber. The preferred method, however, is to provide the entire heat supply during the hardening process by means of pressure chamber heating, because it allows for especially precise regulation and can be constructed less expensively. When hardening form substances which are especially susceptible to develop cracks or to sustain surface damage during the heating-up phase due to evaporation of their water content, such manifestations can be counteracted by introducing a small amount of water into the pressure chamber at the beginning of the heating-up phase so that because of the heating effect, the water relatively quickly is converted into saturated steam which counteracts premature evaporation of water from the form substances.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawing.

BRIEF DESCRIPTION OF THE DRAWINGS

The drawing shows a schematic cross-sectional view of an autoclave according to the present invention for the execution of the method according to the invention.

DESCRIPTION OF THE PREFERRED EMBODIMENTS

The illustrated autoclave includes a pressure chamber 1 which is represented, as usual, for example as a cylindrical shape of which the inner chamber 2 formed by surrounding chamber walls are designated by 3. On one of the ends, the inner chamber 2 of the pressure chamber 1 is accessible through an access door 4 or the like which is opened to provide access for a carrier car 5 on tracks 5' with a load of form substances 6. When loading of the inner chamber 2 with form substances 6 is completed, the access door 4 can be closed pressure tight.

The pressure chamber 1 is provided with insulation 7 over its entire outer circumference. As usual, the insulation also extends to the area of the access door 4 which is indicated by 8.

According to the drawing, the pressure chamber 1 can be configured as a double casing chamber in its upper part or at least in certain areas, whereby between the chamber casings 3 and 9 there results a space 10 for the flow through of a heat carrier medium. It is apparent that if the latter configuration is used, the entire pressure chamber 1 is surrounded by a casing. The heat carrying medium, for example, thermo oil, can be fed in at 12 and controlled by valve 11 into the space 10 and exited again at 13, for example, in order to flow through a notillustrated heat exchanger for reheating the heating medium before it reenters the space 10.

As shown at the lower half of the pressure chamber 1, instead it is also possible to utilize a tube-coil heating apparatus 14 as a heating apparatus which can be positioned in a (single) casing chamber 3 and which can be shielded at the outside by the insulation 7. This tube-coil heating apparatus 14 can also be used for the flow-through of a heat carrier medium which is fed by a feeder line 15 and is drawn off at 16.

In principle, it is possible to position such a tube-coil heating apparatus, for example, in the inner chamber 2 of the pressure chamber 1.

Finally, it is also possible to utilize an electrical heating unit instead of a heating apparatus requiring thermo oil or the like. The pressure chamber 1 is as usual equipped with a remote thermometer 17, a manometer 18, as well as a steam outlet line 19, and a steam pressure regulator valve 21 which is located in its supply line 20. The supply line part 22 contains furthermore a safety valve 23.

If needed, after loading the pressure chamber 1 with form substances 6, a specific amount of water is added, and then the heating is turned on. Because of the heat, the water evaporates and forms a steam atmosphere which passes into the saturation state shortly after the heat is turned on and starts the heatingup phase. Due to the continued heating, the temperature increases up to a given upper limit, for example, to 203° C., which can be reached, for example, after 5 hours, and which coincides with an increase in pressure to 16 bars because of the saturation state of the steam. In the course of the heating-up phase, the temperature of the form substances increases also. However, the equalization temperature on the inside of the form substances has a time lag compared to the temperature on the surfaces. Because reaching the equalization temperature is decisive for the thorough hardening of the form substances 6, the selected upper limit temperature is maintained for some time at a constant level subsequent to the heating-up phase, whereby the period of time of this holding phase is dependent on the criteria of building materials and of the shapes of the form substances, and can be derived empirically or by measurements. During the holding phase, no heat by heating, or only as much heat as is needed in order to maintain the upper limit temperature of the steam, is conveyed to the inner chamber 2 of the pressure chamber 1. In order to avoid undesirable heat supply during the holding phase, the heating can be more or less turned off. It is also feasible instead to reduce the temperature of the heat-carrying medium from an initial temperature of, for example, 250° to 300° C. to a temperature of approximately 203° C.

Subsequent to the holding phase, the inner chamber 2 of the pressure chamber 1 receives an amount of heat by heating which considerably exceeds the amount of heat necessary for compensating for the heat loss in the pressure chamber 1 so that in this way, the form substances 6 are supplied with that amount of heat which is required to evaporate the present water content of 20% of volume up to residual 3%, for example. During this phase of additional heat supply, however, steam is blown out of the inner chamber 2 of the pressure chamber 1 with the help of the steam pressure regulator valve 21 (for example into an adjacent pressure chamber 1), with the effect to hold the temperature of the steam in the inner chamber 2 of the pressure chamber 1 constant at a given upper limit value. The steam pressure regulation valve 21 assures accurately that the pressure in the inner chamber 2 of the pressure chamber 1 remains at a constant value of 16 bars.

Whereas the holding phase lasts, for example, 90 minutes, the subsequent heat supplying phase for the evaporation of the water of the form substances 6 can last, for example, 4 hours. The duration of this period depends on a plurality of factors and can be derived either empirically or by measurement of the water content of the form substances.

After this phase, there follows the cooling-down phase during which, within a period of a further 90 minutes, for example, the pressure is decreased linearly from 16 bars to that of the ambient pressure. Thereby the temperature of the saturated steam decreases from the upper limit temperature, for example 203° C., to approximately 75° C., and the form substances are then taken out of the pressure chamber 1.

Instead of maintaining the steam temperature inside the pressure chamber 1 at the given upper limit temperature during the phase of additional heat supply, it is also possible that after reaching the equalization temperature on the inside of the form substances 6, that steam is blown out of the inside of the pressure chamber 1 in such a way that the pressure of the steam decreases continuously or step-by-step. In this way, the evaporation process of the water from the form substances can be controlled, in case it occurs, for example, that the evaporation process at the maintained upper limit temperatures of the steam would lead to a too-strong evaporation process also during the phase of additional heat supply. However, as a rule, the continuous or step-by-step pressure reduction, which coincides with a reduction of the steam temperature because of the saturation state of the steam, will only be carried out up to a value at which the temperature of the steam does not, or does not substantially go below the equalization temperature on the inside of the form substances. If the equalization temperature is, for example 156° C., then accordingly, the pressure decrease will only be carried out to a maximum of approximately 5.8 bars. Pressure over time can thereby be assigned any curve according to how practical it is for the optimal control of the evaporation of water out of the form substances 6, and such a curve in principle may also include temporary pressure increase ranges.

Whereas the above-described autoclave is successful in removing the water of the steam atmosphere in the pressure chamber which settled in the form substances by means of the processing engineering and equipment requirement included in an unbroken drying process, there is also another solution according to the invention which bypasses changes of conditions in the range of the steam pressure curve of water from the start and utilizes at least a relatively dry gaseous heating medium instead of water/steam. For this purpose, the above-described autoclave is equipped with a gas supply line 24 which leads into the pressure chamber 1 and which is connected, via a valve 24, with a gas compressor 26. In its simplest (illustrated) configuration, the gas compressor 26 draws in ambient air and passes it into the pressure container 1.

For the contemplated hardening according to this embodiment, it is unnecessary, or even disadvantageous, to introduce regularly additional water into the autoclave; from the shaping process, the form substances already contain several percent of water which suffices for the physical-chemical hardening process.

Instead of that, after closing the pressure container 1, by opening the valve 25 and turning on the compressor 26, ambient air is passed into the pressure chamber 1 until an inside pressure of, for example 11 bars, is reached, which can be read on the manometer 18. A subsequent heating-up of the pressure chamber to an inside temperature of approximately 200° C. results in an operating pressure of approximately 16.5 bars. At this pressure level, the evaporation temperature of the water is not reached. The water content of the form substances remains unaffected. Any other water also contained in the inner pressure chamber retains its state and, reversely, there is no condensation of water on the form substances to be taken into consideration because the ambient air does not contain a sufficiently high vapor content.

In this embodiment, it is regularly possible to produce products in such a dry state that subsequent drying is unnecessary. A subsequent drying by additional heating in the above-described fashion is, however, possible. The additional heating of the inner chamber after hardening by simultaneously limiting the pressure accomplishes that the heating medium reaches the steam pressure curve of water which leads especially to the evaporation of water contained inside the form substances which is then blown off as steam as previously described.

It is apparent that instead of ambient air, also other suitable gasses or gas mixtures can be utilized as a heating medium insofar as this appears practical under certain circumstances. It is also obvious that the heating of the autoclave does not have to occur directly in the pressure chamber 1, and that it is also possible to heat it externally by providing, for example, a heat exchanger in the supply line 24 which can be used to heat the circulating gaseous heating medium.

For external heating, in general, a heating medium circulation will also have to be provided with a discharge line from the pressure chamber 1, a supply line, and a circulating system for the purpose of circulating the heating medium (via the previously-mentioned heat exchanger).

What I claim is:

1. A method for hardening form substance of building material containing binding agents inside a pressure chamber of an autoclave, comprising conveying a gaseous heating medium to said autoclave, increasing the temperature of the building materials in said autoclave to a given upper limit during a heating-up phase, increasing the pressure within said autoclave above atmospheric pressure and at a pressure which precludes evaporation of water during said heating phase such as to prevent exposure of the form substances in the autoclave to evaporated wet vapor during the heating-up phase, maintaining the temperature in the autoclave at least until a given equalization temperature is reached on the inside of the form substances during a holding phase, maintaining the pressure within said autoclave above atmospheric pressure and at a pressure which precludes evaporation of the water during said holding phase such as to prevent exposure of the form substance in the autoclave to evaporated vapor during the holding phase, said steps of increasing the temperature and the pressure and maintaining the temperature and the pressure resulting in producing in said autoclave a temperature/pressure condition which precludes evaporation of water within the autoclave during said heating-up phase and said holding phase, subsequently reducing the temperature during a cooling-down phase to an expulsion temperature, and reducing the pressure in said autoclave during said cooling-down phase to atmospheric pressure, whereby the form substances are precluded from being exposed to evaported water vapor during the hardening thereof in the autoclave.

2. A method according to claim 1, comprising essentially conveying air to the autoclave as a heating medium.

3. A method according to claim 1, comprising placing the heating medium under increased pressure before the heating.

4. A method according to claim 1, comprising retaining the heating medium enclosed in the autoclave, and heating the heating medium inside the autoclave by means of a heating apparatus.

5. A method according to claim 1, comprising conducting the heating medium in a closed circulation path outside of the autoclave to a heat exchanger.

6. A method according to claim 1, comprising heating the heating medium by means of a heating apparatus connected with a supply line.

7. A method according to claim 1 further comprising heating said heating medium during said holding phase to compensate for heat losses.

8. A method according to claim 7 further comprising blowing off water vapor containing heating medium from said autoclave during said holding phase, and thereby precluding an increase in temperature of said heating medium above said upper limit.

9. A method according to claim 8, comprising regulating the blowing off of water vapor containing heating medium so that pressure on the inside of the autoclave is maintained at a constant value which corresponds to the saturation pressure of the given upper limit value of the temperature of the steam.

10. A method according to claim 8, wherein after reaching the equalization temperature on the inside of the form substances by blowing off water vapor containing heating medium out of the inside of the pressure chamber, the pressure of the steam is reduced during an intermediate phase which is subsequent to the holding phase, and which precedes the cooling-down phase, step-by-step or continuously at the most to a value which corresponds to the saturation pressure at a steam temperature of the value of the equalization temperature.

11. A method according to claim 8, comprising conveying heat to the inner chamber of the pressure chamber exclusively by means of heating.

12. A method according to claim 11, comprising supplying a small amount of water for the initial formation of steam by heating at or before the beginning of the heating-up phase.

13. A method according to claim 1, wherein said form substances are selected from the group consisting of porous silicate and concrete.

14. A method according to claim 1, wherein said from substances to be hardened have a water content of over 5% to 20% by volume and after hardening have a water content of from 3 to 5% by volume.

15. A method according to claim 1, wherein during said heating-up phase, said autoclave is heated to a temperature of at least 156° C., and during said holding phase said autoclave is maintained at a temperature of at least 156° C.

16. A method according to claim 1, wherein during said heating-up phase, said autoclave is pressurized to a pressure of at least 5.8 bars.

17. A method according to claim 1, wherein during said heating-up phase, said autoclave is pressurized to a pressure of from 5.8 to 16.5 bars.

18. A method according to claim 1, wherein during said heating-up phase, said autoclave is heated to a temperature of from 250° to 300° C. and during said holding phase, the temperature of the autoclave is maintained at a temperature from 156° C. to 203° C.

19. A method according to claim 1, wherein said heating-up phase occurs over a period of about 4 to 5 hours.

20. A method according to claim 1, wherein said holding phase is maintained for about 90 minutes.

21. A method according to claim 1, wherein said cooling-down phase occurs over a period of about 90 minutes.

22. Apparatus for hardening form substances of building materials containing binding agents, comprising an autoclave having a pressure chamber for receiving said form substances, conduit means for conveying a gaseous medium to said pressure chamber, heating/pressurizing means for heating said autoclave to a given upper limit and to pressurize said autoclave to a pressure above atmospheric pressure to a pressure which precludes evaporation of water during a heating-up phase such as to prevent exposure of the form substances in the autoclave to evaporated wet vapor during said heating-up phase, said heating/pressurizing means being operable to maintain the temperature and pressure within said autoclave at a temperature/pressure condition which precludes evaporation of water in the autoclave during a holding phase, said heating/pressurizing means maintaining said temperature/pressure condition until an equalization temperature is reached on the inside of said form substances, and reducing means for reducing the temperature and pressure within the autoclave to ambient conditions during a cooling-down phase, whereby the form substances are precluded from being exposed to evaporated water during the hardening thereof in the autoclave.

23. An autoclave according to claim 22, wherein said pressure chamber has at least partial double casing chambers, said double casing chambers defining a space therebetween for the flow-through of a heat carrying medium.

24. An autoclave according to claim 22, wherein said heating/pressurizing means comprises a tube coil heating apparatus.

25. An autoclave according to claim 24, wherein said autoclave comprises a single cased pressure chamber, said tube coil heating apparatus being positioned directly in said single cased pressure chamber, and insulating means insulating said pressure chamber against the environment.

26. An autoclave accoridng to claim 22 further comprising a blowing-off conduit connected to said pressure chamber and a regulation valve in said conduit for controlling the blow-off of steam from said pressure chamber.

27. An autoclave according to claim 22 comprising a closure means for closing off said pressure chamber after loading with said form substances, said conduit means comprising a gas supply line connecting said pressure chamber with a gas pressure pump.

28. An autoclave according to claim 27, wherein said heating/pressurizing means comprises a heating device to which said gas supply line is connected.

29. An autoclave according to claim 28, wherein said heating device is connected with said gas supply line which leads out of said pressure chamber and which forms a closed circulation path with said gas supply line.

30. An autoclave according to claim 29, further comprising a circulation pump in said closed circulation path.

* * * * *